United States Patent
Goel et al.

(10) Patent No.: US 8,310,967 B1
(45) Date of Patent: Nov. 13, 2012

(54) INFRASTRUCTURE AND AD-HOC NODE DEVICE

(75) Inventors: Sandesh Goel, Pune (IN); Kaustubh Shrikrishna Patwardhan, Pune (IN); Rajesh Shreeram Bhagwat, San Jose, CA (US)

(73) Assignee: Marvell International Ltd., Hamilton (BM)

( * ) Notice: Subject to any disclaimer, the term of this patent is extended or adjusted under 35 U.S.C. 154(b) by 529 days.

(21) Appl. No.: 12/484,563

(22) Filed: Jun. 15, 2009

Related U.S. Application Data (60) Provisional application No. 61/073,941, filed on Jun. 19, 2008.

(51) Int. Cl.
G08C 17/00 (2006.01)

(52) U.S. Cl. ................................................. 370/311

(58) Field of Classification Search .................. 370/311, 370/324, 328
See application file for complete search history.

(56) References Cited

U.S. PATENT DOCUMENTS

| | | | |
|---|---|---|---|
| 4,337,463 A * | 6/1982 | Vangen | 368/47 |
| 7,239,882 B1 | 7/2007 | Cook | |
| 7,342,895 B2 | 3/2008 | Serpa et al. | |
| 7,595,768 B2 | 9/2009 | Li et al. | |
| 7,957,340 B2 | 6/2011 | Choi et al. | |
| 7,966,036 B2 * | 6/2011 | Kojima | 455/552.1 |
| 8,072,913 B2 | 12/2011 | Desai | |
| 8,078,111 B2 | 12/2011 | Jovicic et al. | |
| 8,229,087 B2 | 7/2012 | Sumioka et al. | |
| 8,254,296 B1 | 8/2012 | Lambert | |
| 2004/0192222 A1 | 9/2004 | Vaisanen et al. | |
| 2005/0174962 A1 * | 8/2005 | Gurevich | 370/328 |
| 2006/0079232 A1 * | 4/2006 | Omori et al. | 455/436 |
| 2006/0268756 A1 * | 11/2006 | Wang et al. | 370/310 |
| 2007/0014314 A1 | 1/2007 | O'Neil | |
| 2007/0223430 A1 | 9/2007 | Desai et al. | |
| 2008/0139212 A1 | 6/2008 | Chen et al. | |
| 2008/0161031 A1 | 7/2008 | Tu | |
| 2008/0181154 A1 * | 7/2008 | Sherman | 370/311 |
| 2008/0232287 A1 * | 9/2008 | Shao et al. | 370/311 |
| 2009/0196210 A1 * | 8/2009 | Desai | 370/311 |
| 2009/0239471 A1 | 9/2009 | Tran et al. | |
| 2009/0247217 A1 | 10/2009 | Hsu et al. | |
| 2010/0069112 A1 | 3/2010 | Sun et al. | |
| 2010/0130129 A1 | 5/2010 | Chang et al. | |
| 2010/0316027 A1 | 12/2010 | Rick et al. | |
| 2011/0007675 A1 | 1/2011 | Chiou et al. | |
| 2011/0009074 A1 | 1/2011 | Hsu et al. | |

OTHER PUBLICATIONS

"Non-Final Office Action", U.S. Appl. No. 12/616,454, (Dec. 22, 2011), 8 pages.
"Non-Final Office Action", U.S. Appl. No. 12/732,036, Aug. 9, 2012, 13 pages.
"Notice of Allowance", U.S. Appl. No. 12/616,454, Aug. 22, 2012, 4 pages.
"Supplemental Notice of Allowance", U.S. Appl. No. 12/716,569, Jul. 23, 2012, 2 pages.

(Continued)

*Primary Examiner* — Anh-Vu Ly
*Assistant Examiner* — Mohammad Anwar (57) ABSTRACT

An infrastructure and ad-hoc node device is described. In embodiments, a node device includes an ad-hoc interface for data communications via an ad-hoc network that includes peer devices of a first basic service set (BSS). The node device also includes an infrastructure interface for additional data communications via an infrastructure network of nodes that communicate via an access point of a second basic service set. A power save service can optimize a power save mode of the node device by minimizing a device communication mode during which the data communications and the additional data communications are received over a shared communication channel, or are received over different communication channels.

20 Claims, 7 Drawing Sheets

OTHER PUBLICATIONS

"Final Office Action", U.S. Appl. No. 12/616,454, (Apr. 11, 2012), 19 pages.

"Notice of Allowance", U.S. Appl. No. 12/716,569 (Apr. 19, 2012), 7 pages.

* cited by examiner

INFRASTRUCTURE AND AD-HOC NODE DEVICE

RELATED APPLICATION

This application claims priority to U.S. Provisional Patent Application Ser. No. 61/073,941 filed Jun. 19, 2008, entitled "Simultaneous Adhoc/Infra Design" to Goel et al., the disclosure of which is incorporated by reference herein in its entirety.

BACKGROUND

A communication network can be implemented as a wired or wireless communication network of various fixed and/or mobile devices that are commonly referred to as nodes, client devices, and/or peer devices of the network. In an ad-hoc communication network, each of the peer devices can receive and communicate data throughout the network, such as throughout a college campus, metropolitan area, community network, and across other geographic areas. A peer device is typically part of an ad-hoc network for the duration of a communication session or, for mobile or portable devices, while in proximity to the ad-hoc network. In an infrastructure communication network, an access point communicates with a network of node devices.

The peer devices and node devices in the various networks can implement system-on-chip (SoC) integrated circuits that are being utilized in smaller and/or increasingly complex consumer electronic devices, such as cell phones, media players, digital cameras, network equipment, and the like. Typically, all or most of the electronic circuitry, a microprocessor, memory, input-output (I/O) logic control, communication interfaces and components, other hardware, firmware, and/or software to run a device can be integrated within an SoC. As the peer devices and node devices are designed to be smaller and more complex, conserving device power continues to be a design initiative, particularly when the devices are smaller and have limited battery or power cell space.

SUMMARY

This summary introduces concepts of an infrastructure and ad-hoc node device that are further described below in the Detailed Description. Accordingly, the summary should not be considered to identify essential features nor used to limit the scope of the claimed subject matter.

In embodiments of an infrastructure and ad-hoc node device, a node device includes an ad-hoc interface for data communications via an ad-hoc network that includes peer devices of a first basic service set (BSS). The node device also includes an infrastructure interface for additional data communications via an infrastructure network of nodes that communicate via an access point of a second basic service set. A power save service can optimize a power save mode of the node device by minimizing a device communication mode during which the data communications and the additional data communications are received over a shared communication channel.

In other embodiments, a method is implemented to route data communications via an ad-hoc network that includes peer devices of a first basic service set (BSS); route additional data communications via an infrastructure network of nodes that communicate via an access point of a second basic service set; and optimize a power save mode by minimizing a device communication mode during which the data communications and the additional data communications are received over a shared communication channel.

In other embodiments, a node device includes an ad-hoc interface for data communications via an ad-hoc network that includes peer devices of a first basic service set (BSS). The node device also includes an infrastructure interface for additional data communications via an infrastructure network of nodes that communicate via an access point of a second basic service set. A channel switch is implemented to switch between a first communication channel for the ad-hoc network and a second communication channel for the infrastructure network. A power save service is implemented to communicate a notification to one of the basic service sets that indicates the node device is entering a power save mode to facilitate communication with another of the basic service sets.

In other embodiments, a method is implemented to route data communications via an ad-hoc network that includes peer devices of a first basic service set (BSS); route additional data communications via an infrastructure network of nodes that communicate via an access point of a second basic service set; switch between a first communication channel for the ad-hoc network and a second communication channel for the infrastructure network; and communicate a notification to one of the basic service sets to indicate entering a power save mode to facilitate communication with another of the basic service sets.

BRIEF DESCRIPTION OF THE DRAWINGS

Embodiments of an infrastructure and ad-hoc node device are described with reference to the following drawings. The same numbers are used throughout the drawings to reference like features and components.

DETAILED DESCRIPTION

Embodiments of an infrastructure and ad-hoc node device include a node device that is implemented for approximate simultaneous infrastructure and ad-hoc modes of operation in respective infrastructure and ad-hoc networks. The node device can operate as an infrastructure client and can operate in an ad-hoc mode using a single MAC and PHY (i.e., an integrated media access controller and Ethernet physical layer). In embodiments, the node device includes an ad-hoc interface for data communications via an ad-hoc network that includes peer devices of a first basic service set (BSS). The node device also includes an infrastructure interface for additional data communications via an infrastructure network of nodes that communicate via an access point of a second basic service set.

The node device operates as an infrastructure client and operates in an ad-hoc mode to receive the data communications from the ad-hoc network and the additional data communications from the infrastructure network over a shared communication channel. In another embodiment of different channel operation, the node device includes a channel switch to switch between a first communication channel for the ad-hoc network and a second communication channel for the infrastructure network. The node device implements a power save service to optimize a power save mode of the node device by minimizing a device communication mode during which the data communications and the additional data communications are received over the shared communication channel.

While features and concepts of the described systems and methods for an infrastructure and ad-hoc node device can be implemented in any number of different environments, systems, networks, and/or various configurations, embodiments of an infrastructure and ad-hoc node device are described in the context of the following example networks and environments.

Figure 1:
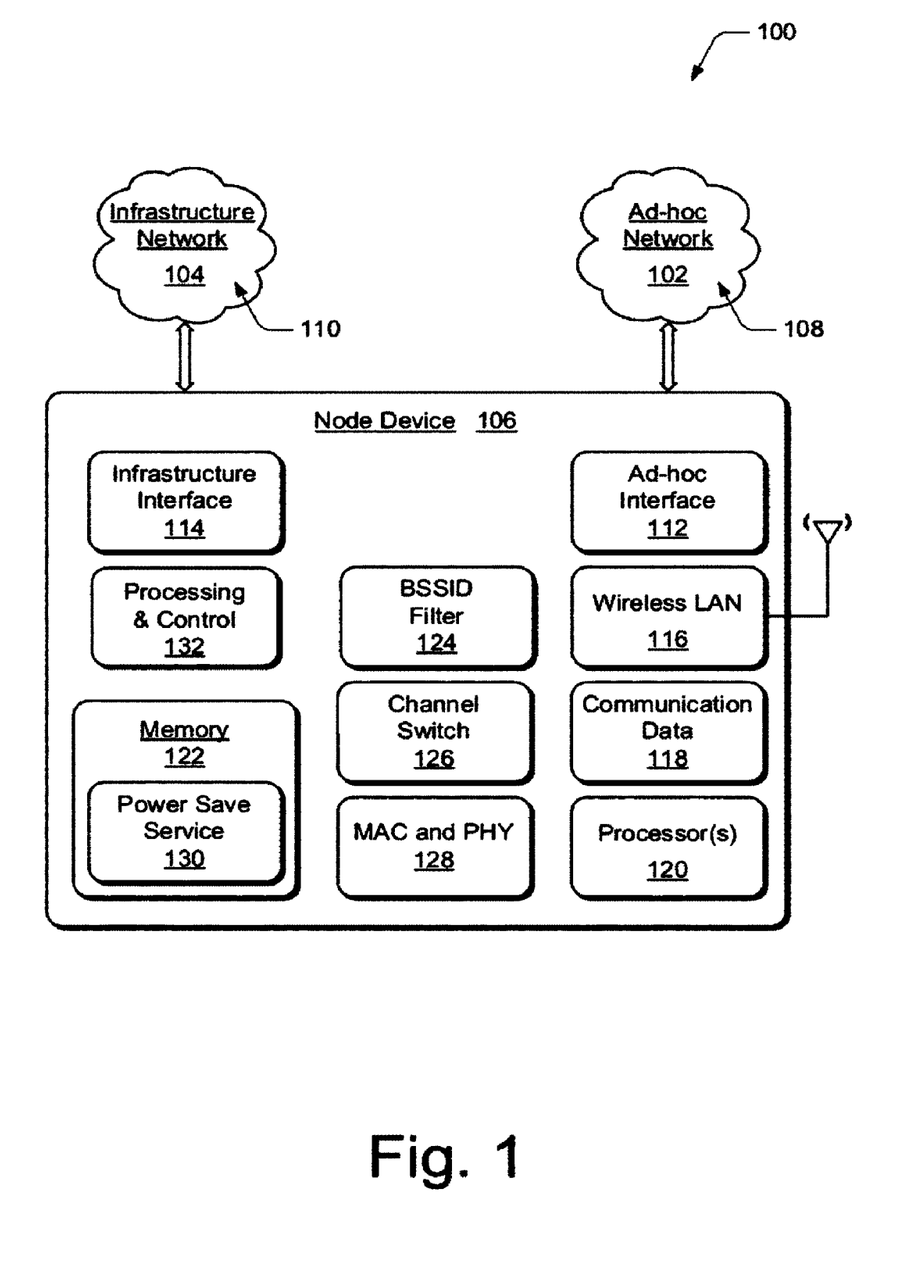
FIG. 1 illustrates an example system in which embodiments of an infrastructure and ad-hoc node device can be implemented.

FIG. 1 illustrates an example system 100 that includes an ad-hoc network 102, an infrastructure network 104, and a node device 106 that can be implemented for wired and/or wireless communication with both of the networks. The node device 106 is communicatively connected to an access point of the infrastructure network 104, and communicatively connected with multiple peer devices of the ad-hoc network 102 for simultaneous operation (or approximate simultaneous operation). The ad-hoc network 102 can be implemented as a local area network or other small network of peer devices that collectively form a basic service set 108. A peer device or network device is typically part of the ad-hoc network 102 for the duration of a communication session or, for mobile or portable devices, while in proximity to the ad-hoc network. The infrastructure network 104 can be implemented as a network of nodes that communicate via one or more access points, and an infrastructure basic service set 110 includes the access points and associated network devices. A basic service set (BSS) includes the peer or network devices that communicate with each other through an access point within a wireless local area network (WLAN).

The node device 106 includes an ad-hoc interface 112 that interfaces and communicatively links the node device with the ad-hoc network 102 for wired and/or wireless data communications for ad-hoc client operation. The node device 106 also includes an infrastructure interface 114 that interfaces and communicatively links the node device with the infrastructure network 104 for wired and/or wireless data communications for infrastructure client operation.

The node device 106 is implemented to receive and communicate data (e.g., route data, transmit data, broadcast data, etc.) when communicatively connected in a network. Example node device 106 represents any type of fixed or mobile communication-enabled device implemented for data communication as a node in the ad-hoc network 102 and/or the infrastructure network 104. For example, node device 106 may be implemented as any one or combination of a wired and/or wireless device, network node device, client device, peer device, media device, computer device, communication device, telephone (e.g., cellular, VoIP, WiFi, etc.), high definition television (HDTV), television set-top box, video processing and/or rendering device, appliance device, gaming device, electronic device, vehicle, workstation, access point, and/or as any other type of device implemented for both infrastructure and ad-hoc data communication as a node device.

Node device 106 includes various components to enable wired and/or wireless data communications as a peer device in the ad-hoc network 102 and as a node device in the infrastructure network 104. In addition, node device 106 can be implemented with any number and combination of differing components as further described with reference to the example device shown in FIG. 8. Node device 106 may also be associated with a user (i.e., a person) and/or an entity that operates the device such that the node device describes logical devices that include users, software, and/or a combination of devices.

In addition to the ad-hoc interface 112 and the infrastructure interface 114, the various components of node device 106 include wireless LAN (WLAN) components 116, such as a communication interface and/or transceiver, that enables wireless communication of communication data 118 (e.g., received data, data that is being received, data scheduled for broadcast, data packets of the data, etc.). Node device 106 also includes one or more processors 120 (e.g., any of microprocessors, controllers, and the like), and memory 122, such as any type of random access memory (RAM), a low-latency nonvolatile memory such as flash memory, read only memory (ROM), and/or other suitable electronic data storage.

In an embodiment, node device 106 interfaces with the ad-hoc network 102 and the infrastructure network 104 over a shared communication channel. For shared channel operation, an access point of the infrastructure network 104 and peer devices in the ad-hoc network 102 communicate data on the same channel. In an alternate embodiment, node device 106 interfaces with the ad-hoc network 102 over a first communication channel, and interfaces with the infrastructure network 104 over a second, different communication channel. For different channel operation, the access point of the infrastructure network 104 and the peer devices in the ad-hoc network 102 communicate data over different channels.

Node device 106 includes a basic service set (BSS) identifier (BSSID) filter 124 and/or a channel switch 126. For shared channel operation at node device 106, the BSSID filter 124 filters the data communications that are received from the ad-hoc network 102 via the ad-hoc interface 112 and/or the data communications that are received from the infrastructure network 104 via the infrastructure interface 114. A BSS identifier uniquely identifies each basic service set, such as basic service set 108 that corresponds to ad-hoc network 102 and basic service set 110 that corresponds to infrastructure network 104. In an implementation, the BSSID for the infrastructure network 104 is the media access controller (MAC) address of the access point in the network. In another implementation, the BSSID for the ad-hoc network 102 is a MAC address that is randomly generated.

For different channel operation at node device 106, the channel switch 126 switches between the first communication channel for the ad-hoc network 102 and the second, different communication channel for the infrastructure network 104. Node device 106 also includes an integrated, single MAC and PHY 128 (media access controller and Ethernet physical layer) to process the data communications received from the ad-hoc network 102 via the ad-hoc interface 112, and to process the data communications received from the infrastructure network 104 via the infrastructure interface 114.

Node device 106 also includes a power save service 130 that implements embodiments of an infrastructure and ad-hoc node device. In an implementation, the power save service 130 may be any one or combination of hardware, firmware, or fixed logic circuitry that is implemented in connection with processing and control circuits which are generally identified at 132. Alternatively and/or in addition, the power save service 130 may be implemented at node device 106 as computer-executable instructions maintained by memory 122 and executed by processors 120 to implement various embodiments and/or features of an infrastructure and ad-hoc node device.

In an embodiment, the power save service 130 is implemented to minimize a device communication mode at node device 106 by minimizing transitions between a power save mode and the device communication mode (also referred to as a device awake mode). The infrastructure BSS 110 has a global time that every device in the infrastructure network 104 shares, and that is controlled and distributed by the access point in the network. The ad-hoc BSS 108 has a global time that is set by the first node that starts the ad-hoc network 102, and the time is distributed to each peer device that joins the network.

The power save service 130 can optimize the power save mode by determining a time synchronization function (TSF) offset that is a time duration between when an infrastructure interval beacon is received and when an ad-hoc interval beacon is received. The power save service 130 can include a timer to determine a TSF update from a BSSID that is received via the ad-hoc interface 112 from the basic service set 108. The power save service 130 can then compute the TSF offset based on a timestamp field of the infrastructure interval beacon.

For ad-hoc operation in the ad-hoc network 102, a power save mode can be implemented at the node device 106 to maintain the TSF offset, and to sequence between the power save mode and the device communication mode. The power save mode is implemented when power save is enabled for both of the logical entities as an ad-hoc peer device and as an infrastructure client device. In an implementation of the power save mode, a hardware TSF update is based on an ad-hoc BSSID. A TSF offset for the infrastructure BSS 110 is tracked by software. The TSF offset can be computed based on a timestamp field in an interval beacon received from the access point in the infrastructure network 104, and based on a received TSF value tagged in a frame by the MAC receiver. A hardware TSF value is used to compute an ad-hoc target beacon transmission time (TBTT) and determine when to enter the device communication mode to receive an ad-hoc beacon from the ad-hoc network 102.

The TSF offset can be combined with the hardware TSF value that is used to compute an access point's TBTT and determine when to enter the device communication mode for an infrastructure beacon received from the infrastructure network 104. Node device 106 enters the device communication mode to receive beacons from both of the ad-hoc BSS 108 and the infrastructure BSS 110, and then returns to the power save mode if conditions for both the infrastructure BSS 110 and the ad-hoc BSS 108 are met. In various embodiments, the device communication mode can be optimized.

In an embodiment, a TSF offset is computed and the hardware at node device 106 keeps track of one TSF value. In a simultaneous mode of operation (or an approximate simultaneous mode of operation), the TSF value of the ad-hoc BSS 108 is tracked to facilitate ad-hoc beacon generation by the hardware. Accordingly, the TSF of the infrastructure BSS 110 is tracked by software at node device 106. Software tracking can be implemented by computing the offset between the TSF values of the two basic service sets (e.g., ad-hoc BSS 108 and infrastructure BSS 110 in this example). The TSF offset is then calculated periodically to account for clock drifts which may compound over time and/or the TSF offset is recomputed with every beacon received from the access point in the infrastructure network 104.

The TSF offset can be computed using the beacon received from the access point in the infrastructure network 104 using two values: the TSF value in the receiver information field (e.g., rx_info) of the received beacon which is a value of the TSF when the first bit of a packet is received at the MAC hardware receiver; and the timestamp field in a payload of a beacon frame which is a value in an access point TSF when the first bit of the field is transmitted over the air. The difference between the two values can be adjusted based on the receive PHY delay and based on the time taken for the bits before the timestamp field is to be transmitted to arrive at the correct TSF offset.

If the ad-hoc TSF changes, the TSF offset can also be changed. The ad-hoc TSF may change due to the receipt of a beacon containing a matching SSID and a higher value of a TSF than at node device 106. This condition can be detected and the TSF offset updated. The condition can be detected if a received TSF value is tagged in the rx_info field of an incoming frame. In an implementation, the timestamp field and the TSF tagged in the rx_info field are reviewed for every ad-hoc beacon that is received with a matching SSID to determine if the TSF has been updated.

However, if the TSF value is not tagged in the rx_info field, this can be detected as follows: when the TSF offset is initially computed, the TSF value is recorded and a microsecond counter started; for every ad-hoc beacon that is received with a matching SSID, the recorded TSF value plus the counter value are compared with the timestamp that is received in the beacon (i.e., taking into account a delay due to the timestamp being received over the air); if the timestamp is higher by a delta, then an implication is that the TSF has been updated, in which case the TSF offset is adjusted. Otherwise, the TSF has not been updated and TSF offset does not need to be adjusted. In either case, the TSF value is re-recorded and the microsecond counter restarted.

In an embodiment, the device communication time is optimized at node device 106. If a beacon interval of one BSS is a multiple of the other, then the device communication mode or time is optimized by minimizing the sleep-awake-sleep transitions. The power save service 130 can be implemented to force the ad-hoc beacon interval to equal the infrastructure beacon interval. Alternatively, the power save service 130 can be implemented to force a target beacon transmission time (TBTT) for the ad-hoc network to follow infrastructure interval beacons so that both are processed during the same communication cycle. This is achieved by utilizing a property of ad-hoc BSS that all of the member nodes adopt a higher TSF value.

For example, if the higher of two beacon intervals is B microseconds, a snapshot of the TSF values for both the ad-hoc BSS and the infrastructure BSS is generated at the same time, and the values are TSFadhoc and TSFinfra microseconds. The current TBTT offset can be computed, and T1=((TSFadhoc % B)−(TSFinfra % B)+B)) % B. The TBTT offset that is sought is T2 which is the duration of the infrastructure BSS beacon. The ad-hoc TSF can be adjusted so that the TBTT offset becomes T2 instead of T1, and (T2−T1+B) % B is added to ad-hoc TSF to generate an ad-hoc beacon or probe response with the new TSF value. The TSF update can then be communicated to the peer devices of the ad-hoc network 102 during an announcement traffic indication message (ATIM).

Figure 2:
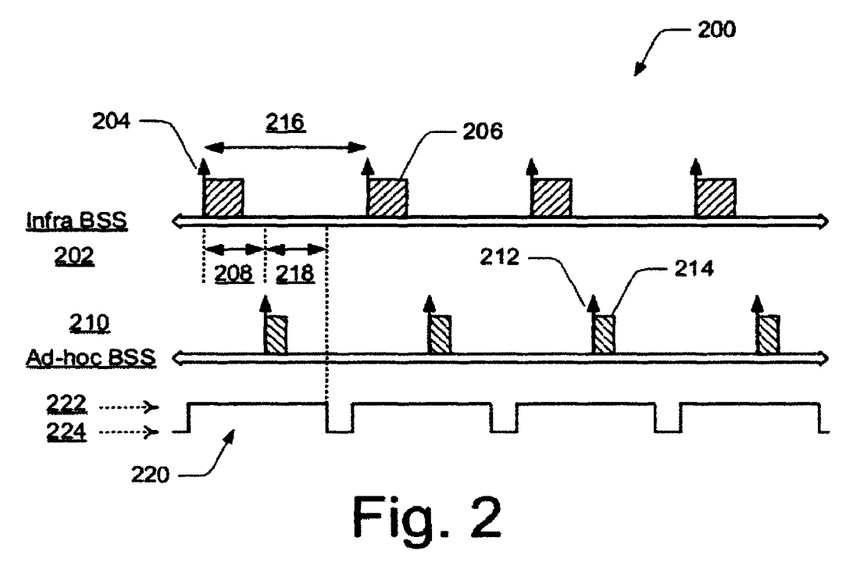
FIGS. 2 and 3 illustrate example timing charts for infrastructure and ad-hoc network interval beacons, and a timing cycle between a power save mode and device communication mode.

FIG. 2 illustrates a timing chart 200 that shows a result after a TSF update and/or adjustment has been made when both the ad-hoc BSS 108 and the infrastructure BSS 110 have the same beacon interval, such as at every 100 milliseconds. An infrastructure BSS timeline 202 includes indicators 204 of target beacon transmission times (TBTT) of the infrastructure BSS 110, infrastructure beacons 206, and a duration 208 of an infrastructure BSS beacon. An ad-hoc BSS timeline 210 includes indicators 212 of TBTTs of the ad-hoc BSS 108, and ad-hoc beacons 214. The timing chart 200 includes a beacon interval 216 (e.g., B microseconds) that is the higher of the two beacon intervals from the ad-hoc BSS 108 and the infrastructure BSS 110.

In another embodiment of the infrastructure and ad-hoc node device 106 (FIG. 1), the power save service 130 is implemented to establish a time synchronization function (TSF) at the node device 106 as the higher TSF from either an ad-hoc TSF received from the basic service set 108 that corresponds to the ad-hoc network 102, or an infrastructure TSF received from the basic service set 110 that corresponds to the infrastructure network 104. The timing chart 200 includes an indication of the announcement traffic indication message (ATIM) window 218, and includes a timing cycle 220 of the node device 106 that illustrates when the node device is in the device communication mode 222 or in the power save mode 224.

Figure 3:
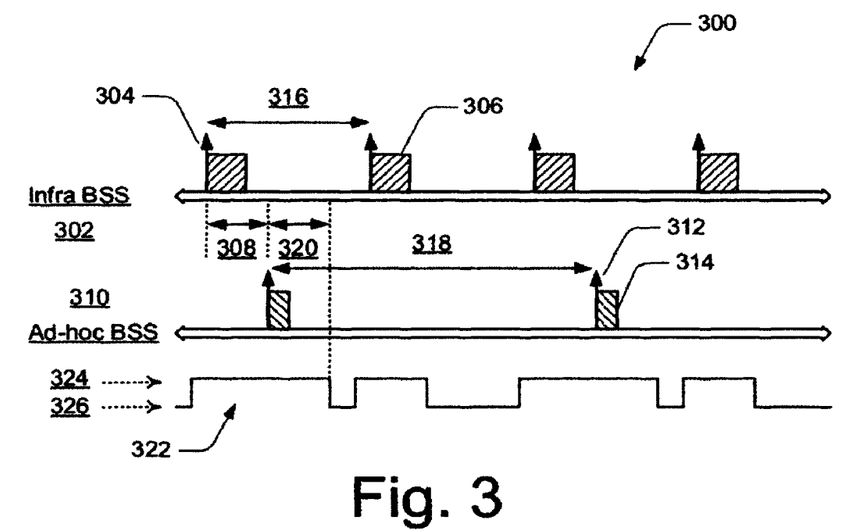

FIG. 3 illustrates a timing chart 300 that shows when one of the beacon intervals is a multiple of the other. In this example, the ad-hoc beacon interval is twice that of the infrastructure beacon interval. An infrastructure BSS timeline 302 includes indicators 304 of target beacon transmission times (TBTT) of the infrastructure BSS 110, infrastructure beacons 306, and a duration 308 of an infrastructure BSS beacon. An ad-hoc BSS timeline 310 includes indicators 312 of TBTTs of the ad-hoc BSS 108, and ad-hoc beacons 314. The timing chart 300 includes a beacon interval 316 of the infrastructure BSS 302, and a beacon interval 318 (e.g., B microseconds) that is the higher of the two beacon intervals from the ad-hoc BSS 108 and the infrastructure BSS 110. The timing chart 300 also includes an indication of the announcement traffic indication message (ATIM) window 320. The timing chart 300 also includes a timing cycle 322 of the node device 106 that illustrates when the node device is in the device communication mode 324 or in the power save mode 326.

In another embodiment of the infrastructure and ad-hoc node device 106 (FIG. 1), and for different channel operation at the node device, the power save service 130 can be implemented to communicate a notification to one of the basic service sets that indicates the node device is entering a power save mode to facilitate communication with another of the basic service sets. For example, the power save service 130 communicates a power save mode notification to the peer devices of BSS 108 (e.g., the ad-hoc network 102), and then initiates a communication channel switch to communicate via the infrastructure interface 114 with BSS 110 (e.g., the infrastructure network 104). Similarly, the power save service 130 communicates a power save mode notification to the access point in BSS 110 of the infrastructure network 104, and then initiates a communication channel switch to communicate via the ad-hoc interface 112 with BSS 108 (e.g., the ad-hoc network 102).

In another embodiment, the power save service 130 is implemented to initiate a clear to send (CTS)-to-self over the ad-hoc network 102, initiate a communication channel switch for communication with the infrastructure network 104, and then switch back for communication with the ad-hoc network before time elapses for the CTS-to-self. In another embodiment, the power save service 130 is implemented to initiate a request to the peer devices of the ad-hoc network 102 to switch to the communication channel of the infrastructure network for communication over a shared communication channel. In another embodiment, the power save service 130 is also implemented to initiate an unavailable notification to the peer devices of the first ad-hoc network 102, and initiate a communication channel switch to the communication channel for the infrastructure network 104.

Although illustrated and described as separate components within node device 106, the BSSID filter 124, channel switch 126, MAC and PHY 128, and/or the power save service 130 can be implemented together as a multi-functional component of the node device. Alternatively, the separate components can each be implemented as several component applications or modules distributed to implement various embodiments and/or features of an infrastructure and ad-hoc node device. In addition, node device 106 can include a system bus or data transfer system (not shown) that couples the various system components within the node device. A system bus may include any one or combination of different bus structures, such as a memory bus or memory controller, a peripheral bus, a universal serial bus, and/or a processor or local bus that utilizes any of a variety of bus architectures.

Figure 4:
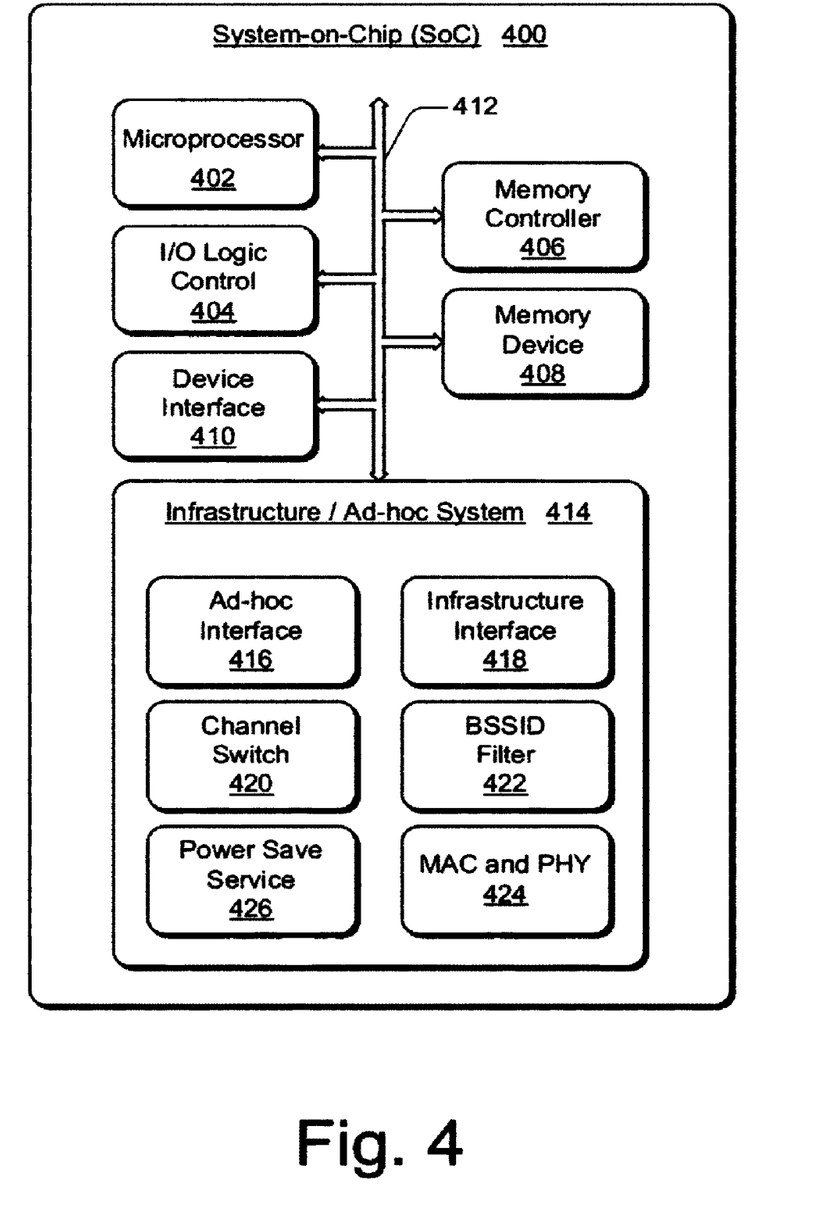
FIG. 4 illustrates an example system-on-chip (SoC) environment in which embodiments of an infrastructure and ad-hoc node device can be implemented.

FIG. 4 illustrates an example system-on-chip (SoC) 400 to implement various embodiments of an infrastructure and ad-hoc node device in any type of a consumer, electronic, and/or computing device. An SoC may be implemented in a fixed or mobile device, such as any one or combination of a communication device, media device, computer device, telephone (e.g., cellular, VoIP, WiFi, etc.), high definition television (HDTV), television set-top box, video processing and/or rendering device, appliance device, gaming device, electronic device, vehicle, workstation, access point, and/or in any other type of device implemented for infrastructure and ad-hoc data communication as a node device.

In this example, the SoC 400 is integrated with electronic circuitry, a microprocessor 402, input-output (I/O) logic control 404 (e.g., to include electronic circuitry, generally), and other hardware, firmware, and/or software. The SoC 400 can also include other various communication interfaces and components, such as wireless LAN (WLAN) components. In this example, the SoC 400 includes a memory controller 406 and a memory device 408, such as any type of a nonvolatile memory, and/or other suitable electronic data storage. The SoC 400 also includes a device interface 410 to interface with a device or other peripheral component, such as when installed in any of the various network and/or node devices described herein. In various embodiments, the SoC 400 can be implemented with any number and combination of the different components described with reference to the SoC 400. Alternatively, the SoC 400 may be implemented without any of the aforementioned components, but rather implemented with alternate components to implement embodiments of an infrastructure and ad-hoc node device.

The SoC 400 includes an integrated data bus 412 that couples the various components of the SoC for data communication between the components. A data bus in the SoC can be implemented as any one or a combination of different bus structures, such as a memory bus or memory controller, an advanced system bus, a peripheral bus, a universal serial bus, and/or a processor or local bus that utilizes any of a variety of bus architectures. In addition, a device that includes SoC 400 can be implemented with any number and combination of differing components as further described with reference to the example device shown in FIG. 8.

In various embodiments of an infrastructure and ad-hoc node device, the SoC 400 includes an infrastructure and ad-hoc system 414 to implement the various embodiments described herein, such as with reference to node device 106. The infrastructure and ad-hoc system 414 includes an ad-hoc interface 416 for data communications with peer devices of an ad-hoc network, and includes an infrastructure interface 418 for data communications with an access point in an infrastructure network. The SoC 400 also includes a channel switch 420, a BSSID filter 422, an integrated MAC and PHY 424, and a power save service 426. Examples of these various components, functions, and/or modules, and their corresponding functionality, are described with reference to the respective components of the example system 100 shown in FIG. 1.

The components of the infrastructure and ad-hoc system 414 in SoC 400, either independently or in combination, can be implemented as computer-executable instructions maintained by memory device 408 and executed by microprocessor 402 to implement various embodiments and/or features of an infrastructure and ad-hoc node device. The infrastructure and ad-hoc system 414, as well as other functionality described to implement embodiments of an infrastructure and ad-hoc node device, may also be provided as a service apart from SoC 400. Alternatively or in addition, system 414 can be implemented as hardware, firmware, fixed logic circuitry, or any combination thereof that is implemented in connection with the I/O logic control 404 and/or other signal processing and control circuits of SoC 400.

Figure 5:
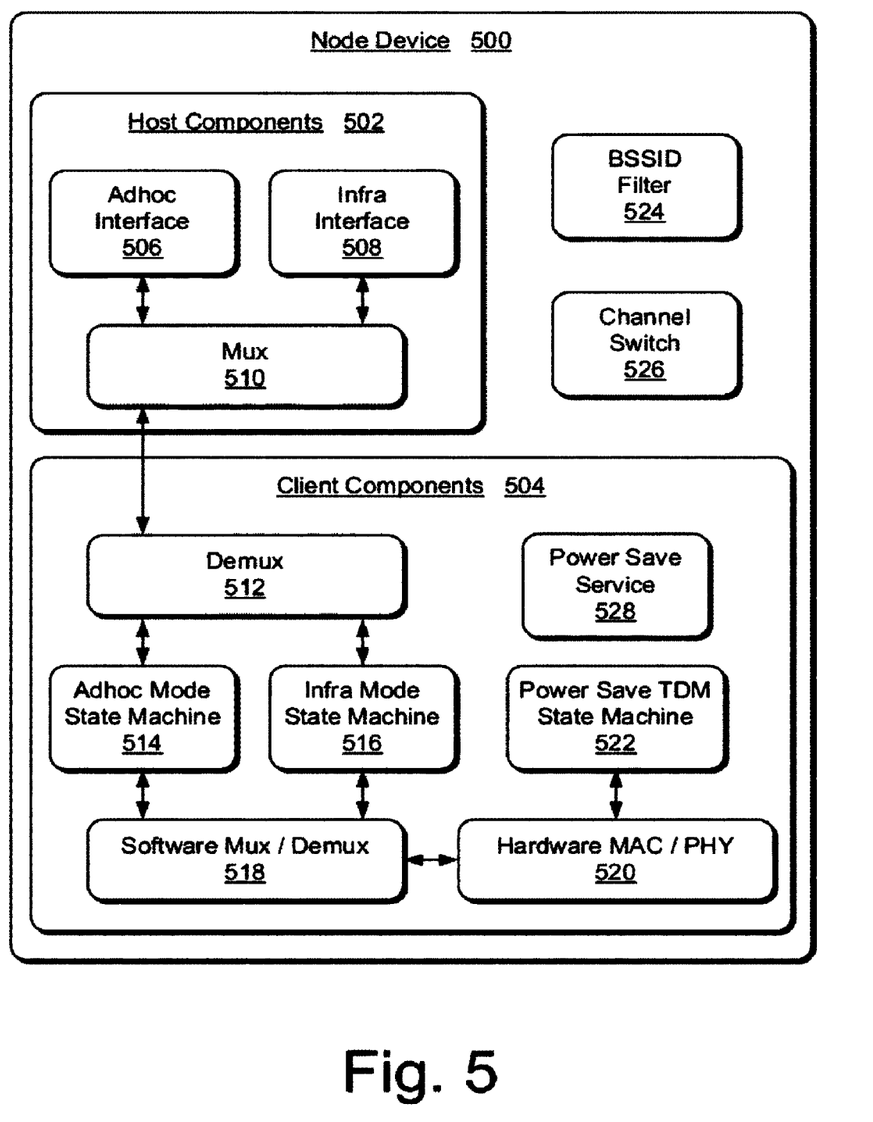
FIG. 5 illustrates an example node device in which embodiments of an infrastructure and ad-hoc node device can be implemented.

FIG. 5 illustrates another example node device 500 implemented for wired and/or wireless communication with an infrastructure and ad-hoc network. In this example, the node device 500 can be communicatively connected to an access point of an infrastructure network, and communicatively connected with multiple peer devices of an ad-hoc network for approximate simultaneous operation as a client device in both networks. Node device 500 includes host components 502 and other client components 504. The host components 502 include an ad-hoc interface 506 that interfaces and communicatively links the node device with the ad-hoc network. The host components 502 also include an infrastructure interface 508 that interfaces and communicatively links the node device with the infrastructure network.

The host components 502 also include a multiplexer 510 that multiplexes command and data inputs received from the ad-hoc interface and the infrastructure interface, and passes the inputs to a demux 512 of the client components 504. An input can be tagged with a virtual interface identifier that is used to de-multiplex the input within the device and pass it on to a corresponding state machine. The device 500 maintains independent state machines 514, 516 and corresponding state information for the respective ad-hoc client mode of operation and the infrastructure client mode of operation. In this example, the client components 504 of node device 500 also include a software mux/demux 518 and a hardware MAC and PHY 520 that interfaces with a power save state machine 522.

The node device 500 can represent any type of fixed or mobile communication-enabled device implemented for data communication as a node in an ad-hoc network and/or an infrastructure network. In addition, node device 500 may be implemented with any number and combination of differing components as further described with reference to the example device shown in FIG. 8. The arrowed connections shown in example node device 500 are merely exemplary to depict communication links and/or data connections between the various components, functions, and/or modules of the device. It is contemplated that any one or more of the arrowed communication links facilitate two-way communication.

In an embodiment, node device 500 interfaces with an ad-hoc network and an infrastructure network over a shared communication channel. For shared channel operation, an access point of the infrastructure network and peer devices in the ad-hoc network communicate on the same communication channel. In an alternate embodiment, node device 500 interfaces with an ad-hoc network over a first communication channel, and interfaces with an infrastructure network over a second, different communication channel. For different channel operation, the access point of the infrastructure network and the peer devices in the ad-hoc network communicate over different communication channels.

Node device 500 also includes a basic service set (BSS) identifier (BSSID) filter 524 and/or a channel switch 526. Node device 500 also includes a power save service 528 that implements embodiments of an infrastructure and ad-hoc node device. Examples of these various components, functions, and/or modules, and their corresponding functionality, are described with reference to the respective components of example system 100 shown in FIG. 1.

For different channel operation of two basic service sets (BSSs) at node device 500, a time division multiplexing (TDM) scheme can be implemented to simultaneously operate as a client device on both of the BSSs. Node device 500 can indicate that the node will be unavailable to one BSS while operating on a different channel to service the other BSS. This is implemented utilizing the power save service 528 to indicate that node device 500 is entering a power save mode, and then switching to the other BSS. Alternatively, node device 500 can use a CTS-to-self to quiet other devices for a fixed amount of time and then switch to the other channel and return before that time elapses. A CTS-to-self can also be used in a power save mode to preclude a peer device that sends an ATIM frame from sending other frames for the duration of the CTS.

For channel switch notification, the frequency and timing of channel switches are utilized to space apart TBTTs to account for interval beacon delays. If one beacon interval is a multiple of the other, then an interval gap that is at least half the smaller beacon interval is utilized by adjusting the ad-hoc TSF. If there is an ongoing voice call on the infrastructure link, then the switching frequency can be determined based on the voice requirements. In one example, a channel is switched as often as every voice packet exchange, such as approximately every 20 milliseconds. At the same time, connectivity in the ad-hoc BSS during the ATIM window is maintained. In an embodiment, the peer devices that are the ad-hoc nodes in the ad-hoc network co-operatively move to the same communication channel as the access point in the infrastructure network.

Other techniques and mechanisms can be implemented for TDM notification. The IEEE 802.11 specification defines a quiet element that can be used to indicate quiet intervals. This quiet element is included in beacons and indicates the duration of the quiet interval and the time that it starts (as an offset from TBTT). The quiet interval can be one-time or periodic with a period which is a multiple of the beacon interval. A communication window may be implemented that is larger than the ATIM window, but shorter than the beacon interval, so that node device 500 operates in a device communication mode for an entire beacon interval once an ATIM frame is sent or received. The peer devices are the nodes in an ad-hoc network that complete transactions initiated by an ATIM exchange within the communication window, and the nodes mutually extend the communication window through proprietary signaling.

An unavailable notification can be implemented as an indication to the peer devices in an ad-hoc network that the sending node is going to be unavailable for the specified duration of time. An unavailable notification may be implemented as a vendor specific action frame and can be either broadcast or unicast to specific nodes or peer devices. An unavailable notification contains information, such as a leave time that is a TSF value, a return time that is also a TSF value, and/or a reason code for being unavailable. If the sending node returns earlier than designated, then the peer devices are notified using an available notification. This notification frame can also be used as an additional mechanism by a node after an ATIM exchange, but before a beacon interval is over.

In an embodiment, the peer devices that are the nodes in an ad-hoc network advertise or make known an ability to support proprietary extensions by including a proprietary vendor specific IE in the beacons and probe responses. This IE can include a signature field to preclude nodes that simply copy the IE from received beacons and probe responses. Conflicts may be detected between multiple ad-hoc peer devices in the same BSS, such as two ad-hoc nodes that both try to adjust the TSF in their favor resulting in TSF instability. Similarly, two ad-hoc nodes may both try to adjust the beacon interval in their favor resulting in oscillation. The conflicts can be detected by monitoring the presence of proprietary IE in the beacons and probe responses sent by the ad-hoc peer devices. If a conflict is detected, then a feature that results in a conflict is invoked by the node with the highest MAC address. Accordingly, if a peer device detects another proprietary ad-hoc node with a higher MAC address, then the peer device does not invoke any proprietary features that may result in conflict.

Example methods 600 and 700 are described with reference to respective FIGS. 6 and 7 in accordance with one or more embodiments of an infrastructure and ad-hoc node device. Generally, any of the functions, methods, procedures, components, and modules described herein can be implemented using hardware (e.g., fixed logic circuitry), software, firmware, manual processing, or any combination thereof. A software implementation of a function, method, procedure, component, or module represents program code that performs specified tasks when executed on a computing-based processor. Example methods 600 and 700 may be described in the general context of computer-executable instructions. Generally, computer-executable instructions can include software, applications, routines, programs, objects, components, data structures, procedures, modules, functions, and the like.

Figure 6:
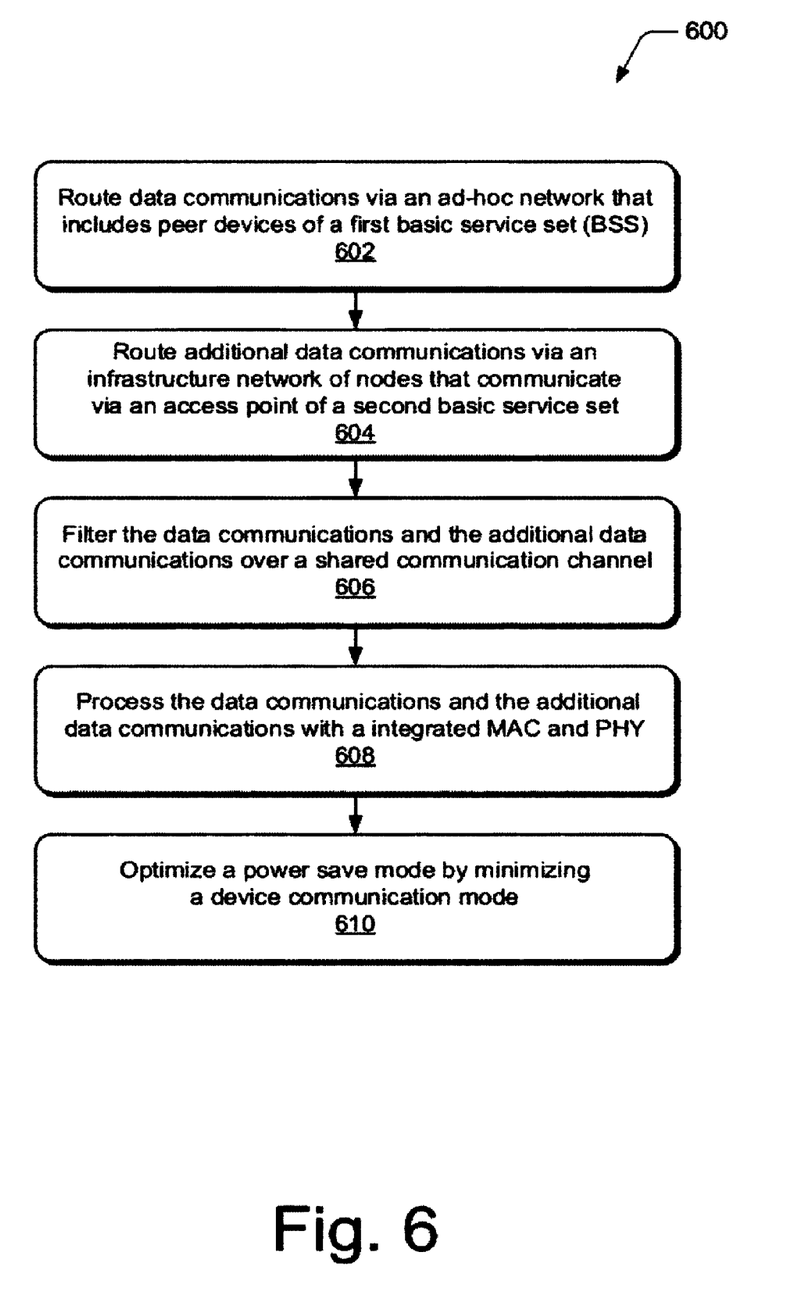
FIGS. 6 and 7 illustrate example methods of an infrastructure and ad-hoc node device in accordance with one or more embodiments.

FIG. 6 illustrates example method(s) 600 of an infrastructure and ad-hoc node device (e.g., node devices 106, 500). The order in which the method is described is not intended to be construed as a limitation, and any number of the described method blocks can be combined in any order to implement the method, or an alternate method.

At block 602, data communications are routed via an ad-hoc network that includes peer devices of a first basic service set (BSS). For example, node device 106 (FIG. 1) is communicatively connected with multiple peer devices of the ad-hoc network 102 that collectively form the basic service set 108. At block 604, additional data communications are routed via an infrastructure network of nodes that communicate via an access point of a second basic service set. For example, node device 106 is also communicatively connected to an access point of the infrastructure network 104, and the infrastructure basic service set 110 includes the access point and associated network devices.

At block 606, the data communications and the additional data communications are filtered over a shared communication channel. For example, node device 106 interfaces with the ad-hoc network 102 and the infrastructure network 104 over a shared communication channel via respective interfaces 112, 114. At block 608, the data communications and the additional data communications are processed with an integrated component comprising a media access controller and an Ethernet physical layer (MAC and PHY). For example, node device 106 also includes a single MAC and PHY 128 that processes the data communications received from the ad-hoc network 102, and processes the data communications received from the infrastructure network 104.

At block 610, a power save mode is optimized by minimizing a device communication mode during which the data communications and the additional data communications are received over the shared communication channel. For example, the power save service 130 at node device 106 minimizes the device communication mode by minimizing transitions between the power save mode and the device communication mode. In an embodiment, optimizing the power save mode includes determining a time synchronization function (TSF) offset that is a time duration between when an infrastructure interval beacon is received and when an ad-hoc interval beacon is received. A TSF update is determined from a BSS identifier (BSSID) that is received via the ad-hoc interface 112 from the first BSS 108, and the TSF offset is computed based on a timestamp field of the infrastructure interval beacon.

In other embodiments, the ad-hoc beacon interval is forced to approximately equal the infrastructure beacon interval; a target beacon transmission time (TBTT) for the ad-hoc network is forced to follow infrastructure interval beacons; and/or a time synchronization function (TSF) is established at node device 106 as a higher TSF that is at least one of an ad-hoc TSF received from the first BSS 108 or an infrastructure TSF received from the second BSS 110.

Figure 7:
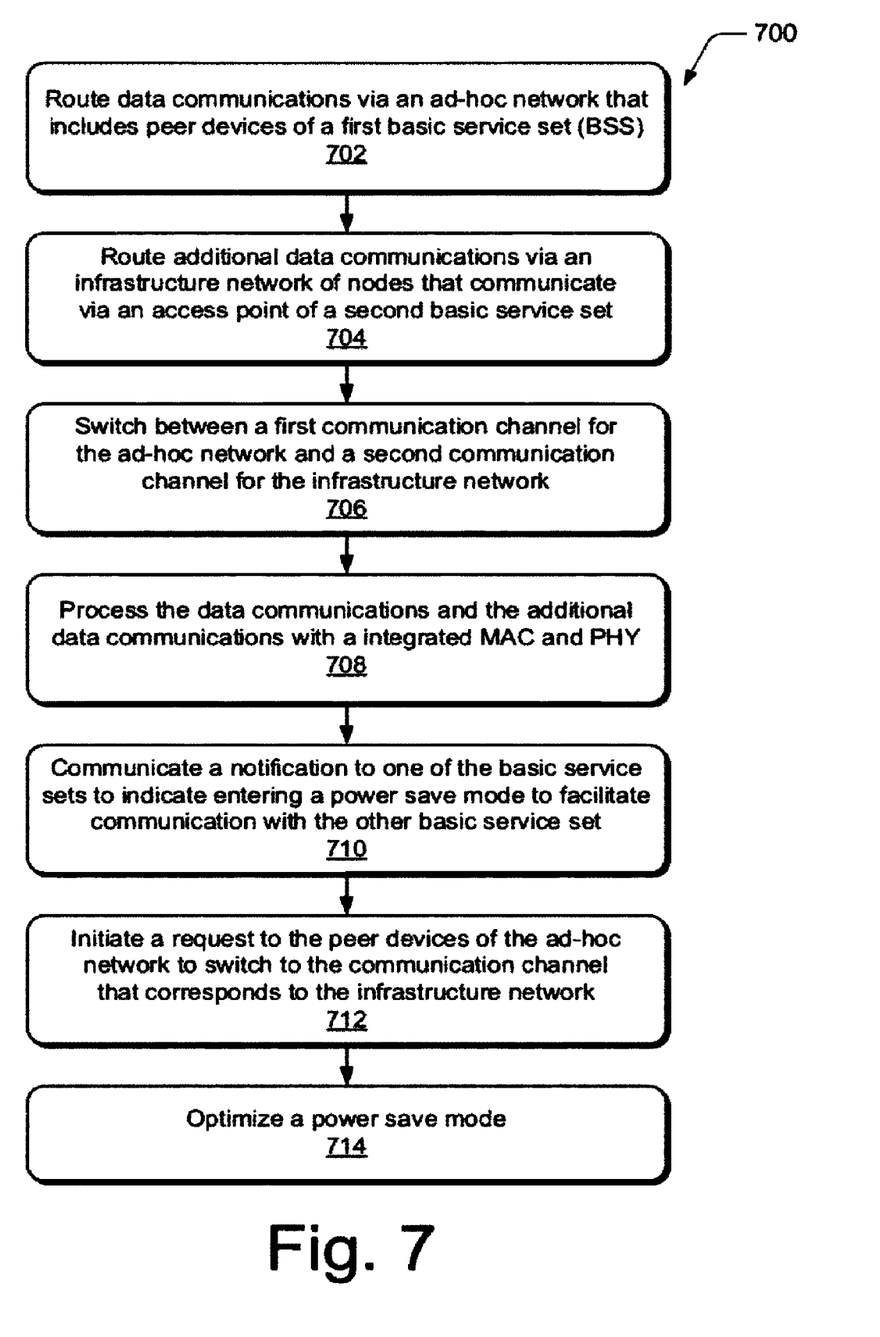

FIG. 7 illustrates example method(s) 700 of an infrastructure and ad-hoc node device (e.g., node devices 106, 500). The order in which the method is described is not intended to be construed as a limitation, and any number of the described method blocks can be combined in any order to implement the method, or an alternate method.

At block 702, data communications are routed via an ad-hoc network that includes peer devices of a first basic service set (BSS). For example, node device 106 (FIG. 1) is communicatively connected with multiple peer devices of the ad-hoc network 102 that collectively form the basic service set 108. At block 704, additional data communications are routed via an infrastructure network of nodes that communicate via an access point of a second basic service set. For example, node device 106 is also communicatively connected to an access point of the infrastructure network 104, and the infrastructure basic service set 110 includes the access point and associated network devices.

At block 706, a first communication channel for the ad-hoc network and a second communication channel for the infrastructure network are switched between for the communications. For example, the channel switch 126 at node device 106 switches between a first communication channel for the ad-hoc network 102 and a second, different communication channel for the infrastructure network 104.

At block 708, the data communications over the first communication channel and the additional data communications over the second communication channel are processed with an integrated component comprising a media access controller and an Ethernet physical layer (MAC and PHY). The single MAC and PHY 128 at node device 106 processes the data communications received from the ad-hoc network 102 over the first communication channel, and processes the data communications received from the infrastructure network 104 over the second, different communication channel.

At block 710, a notification is communicated to one of the basic service sets to indicate entering a power save mode to facilitate communication with the other basic service set. For example, node device 106 notifies the access point of the infrastructure BSS 110 when entering the power save mode, and initiates a channel switch to the first communication channel for the ad-hoc network 102. Similarly, node device 106 notifies the peer devices of the ad-hoc BSS 108 when entering the power save mode, and initiates a channel switch to the second communication channel for the infrastructure network. In another embodiment, node device 106 initiates an unavailable notification to the peer devices of the ad-hoc BSS 108, and initiates a channel switch to the communication channel for the infrastructure network. In another embodiment, node device 106 initiates a CTS-to-self over the ad-hoc network, initiates a channel switch to the communication channel for the infrastructure network, and returns to the ad-hoc network before time elapses for the CTS-to-self.

At block 712, a request is initiated to the peer devices of the ad-hoc network to switch to the communication channel that corresponds to the infrastructure network for communication over a shared communication channel. For example, node device 106 initiates a request to the peer devices of the ad-hoc network 102 to switch to the communication channel for the infrastructure network for communication over a shared communication channel.

At block 714, optimize a power save mode. For example, the power save service 130 at node device 106 minimizes the device communication mode by minimizing transitions between the power save mode and the device communication mode. The power save mode can be optimized by determining a time synchronization function (TSF) offset that is a time duration between when an infrastructure interval beacon is received and when an ad-hoc interval beacon is received. Alternatively or in addition, target beacon transmission times (TBTT) for the ad-hoc network and the infrastructure network can be spaced for channel switches between the first communication channel and the second, different communication channel.

Figure 8:
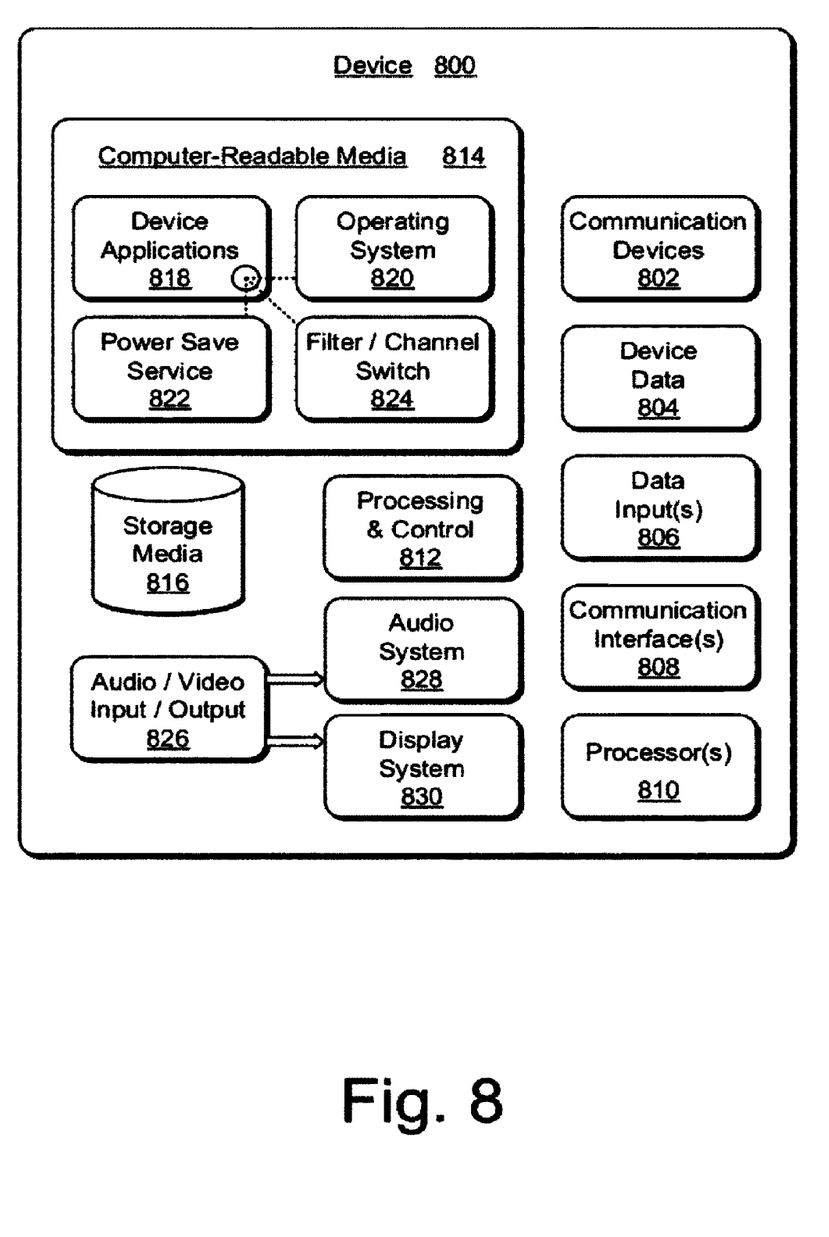
FIG. 8 illustrates various components of an example device that can implement embodiments of an infrastructure and ad-hoc node device.

FIG. 8 illustrates various components of an example device 800 that can be implemented as any type of device that includes a disk drive control system and/or various embodiments of an infrastructure and ad-hoc node device. For example, device 800 can be implemented to include example node device 106 shown in FIG. 1, the system-on-chip (SoC) 400 shown in FIG. 4, and/or the example node device 500 shown in FIG. 5. In various embodiments, device 800 may be implemented as any one or combination of a wired and/or wireless device, network node device, client device, peer device, media device, computer device, communication device, telephone (e.g., cellular, VoIP, WiFi, etc.), television set-top box, video processing and/or rendering device, television device, appliance device, gaming device, electronic device, vehicle, workstation, access point, and/or as any other type of device. Device 800 may also be associated with a user (i.e., a person) and/or an entity that operates the device such that a device describes logical devices that include users, software, firmware, and/or a combination of devices.

Device 800 includes communication devices 802 that enable communication of device data 804 (e.g., received data, data that is being received, data scheduled for broadcast, data packets of the data, etc.). The device data 804 or other device content can include configuration settings of the device and/or information associated with a user of the device. Device 800 also includes one or more data inputs 806 via which any type of data, media content, and/or inputs can be received, such as user-selectable inputs and any other type of audio, video, and/or image data.

Device 800 also includes communication interfaces 808 that can be implemented as any one or more of a serial and/or parallel interface, a wireless interface, any type of network interface, a modem, and as any other type of communication interface. The communication interfaces 808 provide a connection and/or communication links between device 800 and a communication network by which other electronic, computing, and communication devices can communicate data with device 800.

Device 800 includes one or more processors 810 (e.g., any of microprocessors, controllers, and the like) which process various computer-executable instructions to control the operation of device 800, to communicate with other electronic and computing devices, and to implement embodiments of an infrastructure and ad-hoc node device. Alternatively or in addition, device 800 can be implemented with any one or combination of hardware, firmware, or fixed logic circuitry that is implemented in connection with processing and control circuits which are generally identified at 812. Although not shown, device 800 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 800 also includes computer-readable media 814, such as one or more memory components, examples of which include random access memory (RAM), non-volatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), any type of a digital versatile disc (DVD), and the like. Device 800 can also include a mass storage media device 816.

Computer-readable media 814 provides data storage mechanisms to store the device data 804, as well as various device applications 818 and any other types of information and/or data related to operational aspects of device 800. For example, an operating system 820 can be maintained as a computer application with the computer-readable media 814 and executed on processors 810. The device applications 818 can include a device manager (e.g., a control application, software application, signal processing and control module, code that is native to a particular device, a hardware abstraction layer for a particular device, etc.). The device applications 818 also include a power save service 822 and a filter and/or channel switch 824 when device 800 implements various embodiments of an infrastructure and ad-hoc node device. In this example, the device applications 818 are shown as software modules and/or computer applications. Alternatively or in addition, the power save service 822 and the filter and/or channel switch 824 can each be implemented as hardware, software, firmware, or any combination thereof.

Device 800 can also include an audio and/or video input/output system 826 that provides audio data to an audio system 828 and/or provides video data to a display system 830. The audio system 828 and/or the display system 830 can include any devices that process, display, and/or otherwise render audio, video, and image data. Video signals and audio signals can be communicated from device 800 to an audio device and/or to a display device via an RF (radio frequency) link, S-video link, composite video link, component video link, DVI (digital video interface), analog audio connection, or other similar communication link. In an embodiment, the audio system 828 and/or the display system 830 are implemented as external components to device 800. Alternatively, the audio system 828 and/or the display system 830 are implemented as integrated components of example device 800.

Although embodiments of an infrastructure and ad-hoc node device have been described in language specific to features and/or methods, it is to be understood that the subject of the appended claims is not necessarily limited to the specific features or methods described. Rather, the specific features and methods are disclosed as example implementations of an infrastructure and ad-hoc node device.

The invention claimed is:

1. A node device, comprising:
a first communication interface configured to communicate data via an ad-hoc wireless local-area-network (WLAN), the ad-hoc WLAN including peer devices of a first basic service set (BSS);
a second communication interface configured to communicate other data via an infrastructure WLAN, communications of the infrastructure WLAN managed via an access point of a second BSS, the first and the second communication interfaces communicating over a same WLAN communication channel and associated with the first and the second BSSs respectively; and
a power save service configured to:
determine a time synchronization function (TSF) offset based on a time duration between when an infrastructure beacon is received and when an ad-hoc beacon is received; and
minimize, based at least in part on the TSF offset, transitions between an inactive communication mode and an active communication mode during which the data and the other data are received over the same WLAN communication channel via the ad-hoc WLAN and the infrastructure WLAN respectively.

2. A node device as recited in claim 1, wherein the first and the second communication interfaces are virtual interfaces of a single media access controller (MAC) operably coupled with a wireless physical layer (PHY), the MAC and wireless PHY configured to process the data and the other data over the same WLAN communication channel.

3. A node device as recited in claim 1, wherein minimizing the transitions between the inactive communication mode and the active communication mode includes causing the data and the other data to be received during a same period of the active communication mode.

4. A node device as recited in claim 1, wherein an indication of when the infrastructure beacon is received is tagged to the infrastructure beacon by a MAC of the second wireless communication interface.

5. A node device as recited in claim 1, wherein the power save service includes a timer configured to determine a TSF update from a BSS identifier (BSSID) that is received via the first communication interface from the first BSS, and wherein the power save service is further configured to compute the TSF offset based on a timestamp field of the infrastructure beacon.

6. A node device as recited in claim 1, wherein the power save service is further configured to cause an ad-hoc beacon interval to be approximately equal to an infrastructure beacon interval or equal to a multiple of the infrastructure beacon interval.

7. A node device as recited in claim 1, wherein the power save service is further configured to cause, based on the TSF offset, a target beacon transmission time (TBTT) for the ad-hoc network to follow an infrastructure beacon interval.

8. A node device as recited in claim 7, wherein the power save service is further configured to establish a TSF for the ad-hoc network at the node device that is higher in value than an ad-hoc TSF received from the first BSS.

9. A method, comprising:
communicating data of a device via an ad-hoc wireless local-area-network (WLAN), the ad-hoc WLAN including peer devices of a first basic service set (BSS);
communicating other data of the device via an infrastructure WLAN, the infrastructure WLAN managed via an access point of a second BSS, the data and the other data communicated over a same WLAN communication channel using a single media access controller (MAC) and physical layer interface (PHY) configured to receive frames having two or more BSS identifiers (BSSIDs); and
optimizing a power save mode of the device by:
determining a time synchronization function (TSF) offset based on a time duration between when an infrastructure beacon is received and when an ad-hoc beacon is received; and
minimizing, based at least in part on the TSF offset, transitions between an inactive communication mode and an active communication mode during which the data and the other data are received over the same WLAN communication channel via the ad-hoc WLAN and the infrastructure WLAN respectively.

10. A method as recited in claim 9, wherein the data communicated via the ad-hoc WLAN is associated with a state machine and the other data communicated via the infrastructure WLAN is associated with another state machine, the state machine and the other state machine configured to receive the data and the other data respectively from the single MAC.

11. A method as recited in claim 9, wherein determining the TSF offset is further based on a beacon interval of the ad-hoc WLAN or the infrastructure WLAN.

12. A method as recited in claim 9, further comprising determining a TSF offset update based on a timestamp associated with a frame received via the ad-hoc WLAN and a timer counting from a previous TSF offset.

13. A method as recited in claim 9, further comprising causing, based on the TSF offset, a beacon interval of the ad-hoc WLAN to be approximately equal to a beacon interval of the infrastructure WLAN.

14. A method as recited in claim 9, further comprising causing, based on the TSF offset, a target beacon transmission time (TBTT) for the ad-hoc WLAN to follow beacon intervals of the infrastructure WLAN.

15. A method as recited in claim 14, wherein the act of causing includes establishing a TSF that is higher in value than another TSF value received from the first BSS.

16. A node device, comprising:
a first communication interface configured to communicate data via an ad-hoc wireless local-area-network (WLAN), the ad-hoc WLAN including peer devices of a first basic service set (BSS);
a second communication interface configured to communicate other data via an infrastructure WLAN, communications of the infrastructure WLAN managed by an access point of a second BSS, the first and the second communication interfaces communicating over a same WLAN communication channel; and
a power save service configured to:

determine a time synchronization function (TSF) offset based on a time duration between when an infrastructure beacon is received and when an ad-hoc beacon is received; and minimize, based at least in part on the TSF offset, transitions between an inactive communication mode and an active communication mode during which the data and the other data are communicated over the same WLAN communication channel via the ad-hoc WLAN and the infrastructure WLAN respectively.

17. A node device as recited in claim 16, wherein the power save service is further configured to determine the TSF offset based on a beacon interval of the ad-hoc WLAN or the infrastructure WLAN.

18. A node device as recited in claim 16, wherein the power save service is further configured to cause, based on the TSF offset, a beacon interval of the ad-hoc WLAN to be approximately equal to a beacon interval of the infrastructure WLAN.

19. A node device as recited in claim 16, wherein the power save service is further configured to cause, based on the TSF offset, a target beacon transmission time (TBTT) for the ad-hoc WLAN to follow beacon intervals of the infrastructure WLAN.

20. A node device as recited in claim 19, wherein the power save service is further configured to establish a new TSF for the first BSS that is higher in value than another TSF value previously received from the first BSS.

* * * * *